Oct. 10, 1961 W. KATZ 3,003,255
APPARATUS FOR ANALYZING HUMAN PERFORMANCE
Filed Oct. 9, 1959 3 Sheets-Sheet 1

INVENTOR:
Walter Katz
BY
PATENT AGENT

Oct. 10, 1961

W. KATZ 3,003,255

APPARATUS FOR ANALYZING HUMAN PERFORMANCE

Filed Oct. 9, 1959

INVENTOR
Walter Katz

BY *George H Spencer*
ATTORNEY

Oct. 10, 1961 W. KATZ 3,003,255
APPARATUS FOR ANALYZING HUMAN PERFORMANCE
Filed Oct. 9, 1959 3 Sheets-Sheet 3
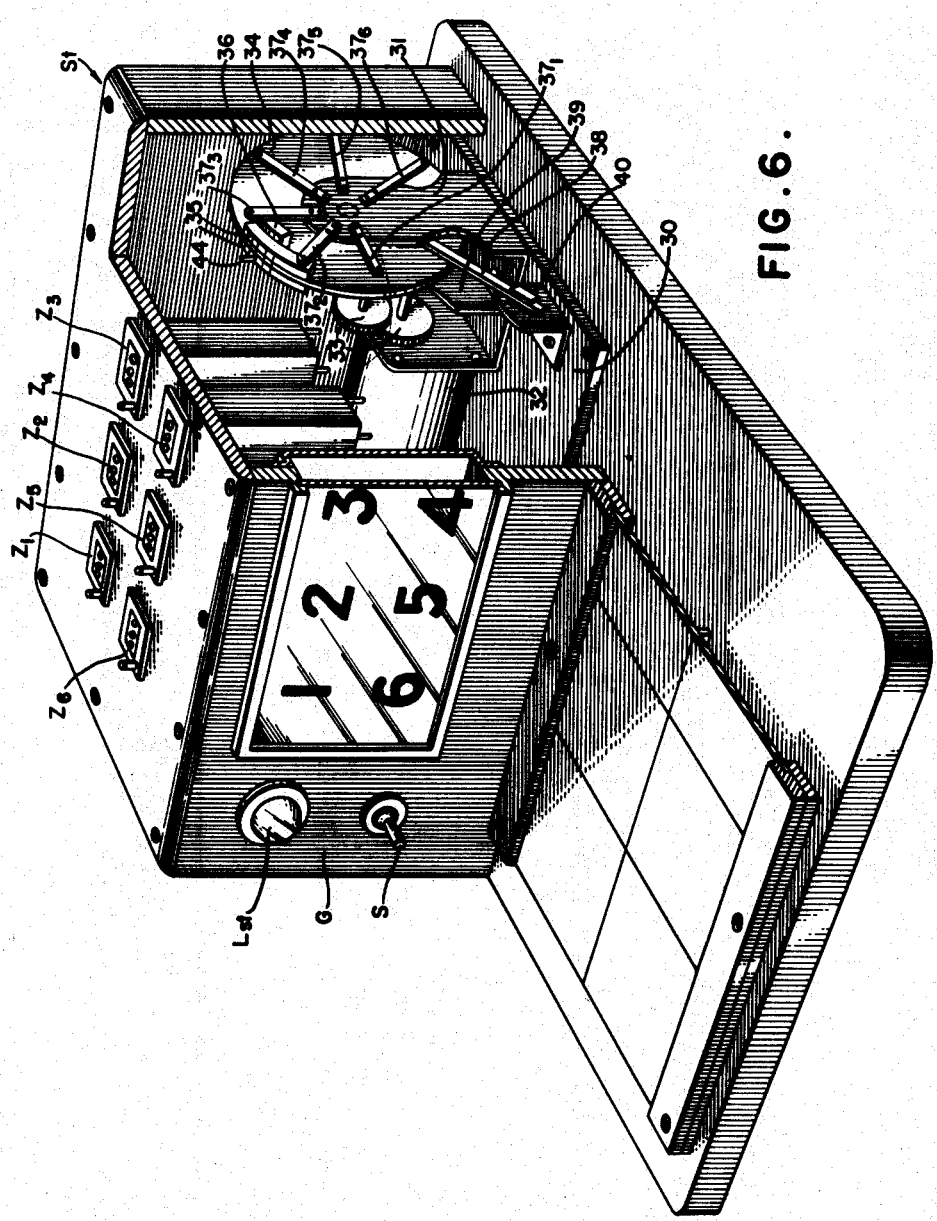
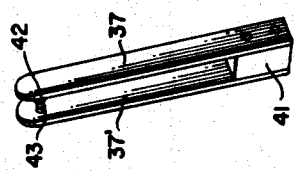
INVENTOR
Walter Katz
BY George H. Spencer
ATTORNEY

United States Patent Office 3,003,255
Patented Oct. 10, 1961

3,003,255
APPARATUS FOR ANALYZING HUMAN PERFORMANCE
Walter Katz, Gertrudenstrasse 22, Hameln, Germany
Filed Oct. 9, 1959, Ser. No. 845,489
Claims priority, application Germany Oct. 11, 1958
2 Claims. (Cl. 35—22)

The present invention relates to an apparatus for analyzing human performance.

It has been known to test human performance by a method in which the human subject undergoes a so-called "tap-test." In this known test, the subject reacts by tapping with a pencil point on a test card divided into different areas in such a manner, that he taps each area one after the other within a predetermined time after receipt of a command. The subject tries to make in each area within the given time the greatest number of pencil taps possible. Generally, the tap test is carried out on a test card having six areas, each of which the subject taps always within ten seconds. Thus, after one minute, the tap test has been completed in the six areas. This psycho-technical measuring method is a very simple means for determining human performance and, therefore, is particularly useful, as it can be applied to almost anybody.

This tap test method, however, is disadvantageous to the extent that evaluation of the test card is very time-consuming and suffers from the difficulty that the same spots of the test card are tapped several times. Thus, the counting of the individual tap points is not only tedious, but also inaccurate. In addition to this, it is disadvantageous that the command has to be given by an attendant, i.e., the reaction time of this attendant is involved in the command, and the manner in which the command is given by the attendant may influence the human subject positively or negatively.

Recently, test methods have become known in which the performance data is automatically recorded. For example, a method has been known which is used for aviation medical tests in which the subject has to take tightly fitting balls from a ball holder and place them in a ball receptacle device in which momentarily different-sized openings are exposed. If the balls are properly placed, a mark is recorded on a recording strip, while incorrectly placed balls are not recorded. An analysis of the performance of the subject can be made by reference to the strip, i.e., by reference to the number of recorded marks. This kind of test method is mostly carried out while the subject is experiencing some kind of burden, for example, a low pressure or an oxygen-starved atmosphere. The subject may also be performing light work by operating the device, said work requiring of him the coordinated application of motor-sensory functions, whereby the course of these functions is automatically determined by the speed of the device. Obviously, such method cannot be applied to all persons, because it is more demanding of the subject than the aforementioned tap test method. In addition, it is inconvenient, as the analysis of the performance data takes substantially longer than in case of a tap test.

It is an object of the present invention to provide an apparatus for carrying out and analyzing a tap performance test, whereby the abovementioned difficulties are overcome.

It is another object of the invention to provide a device comprising a command transmitter in the form of an optical or acoustical signaling unit and to record the number of taps on the individual test card areas by means of pulse counters assigned thereto, said counter being actuated or operated acoustically, electro-mechanically, and/or photo-electrically. The command transmitter is acted upon by a control mechanism which is coupled with several counters in such a manner, that each counter is always ready for counting the taps in a particular card area indicated by the transmitter.

In case of electro-accoustical control of the counters, the tapping noises produced on the test card are fed to amplifiers or the like by means of a microphone and are converted into electrical pulses which, in turn, operate the counters via relays. If electro-mechanical control of the counters is used, the test card is placed on a base below which there is provided a contact means mounted in a manner known per se, said contact means being operated by depressing the base. In this kind of arrangement, the pulses necessary for the control of the counters are produced by operating the contact means. The electro-mechanical control of the counters may be carried out in such a manner, that contact is made in a manner known per se on a copper plate by means of a silver contact stylus, said copper plate being provided with several contact areas.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 6 is a perspective view similar to FIGURE 1, but shows some of the parts broken away so as more clearly to illustrate the operating mechanism.

FIGURE 7 is a perspective view of a detail of the mechanism of FIGURE 6.

Figure 1:
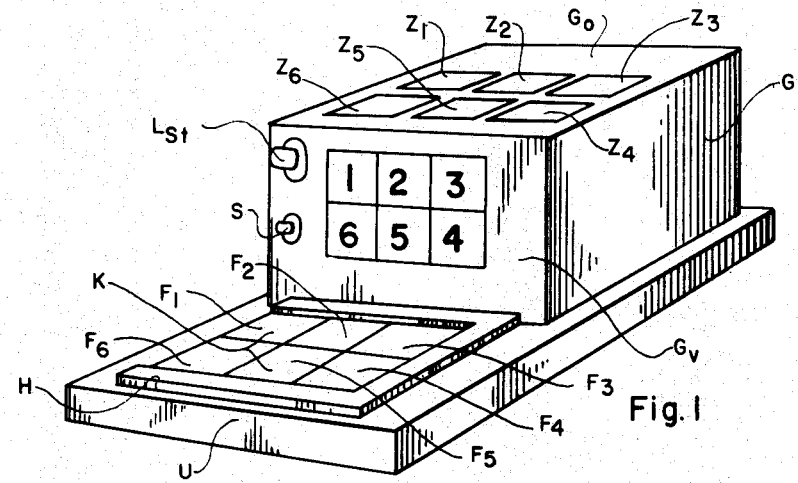
FIGURE 1 shows a perspective view of an embodiment of an electro-acoustically operating device according to the invention having an optical command transmitter.

The device according to FIGURE 1 comprises a base U supporting a rectangular casing G containing the electric components of the device. Six areas 1 to 6 are provided on the front surface $G_V$ of the casing G, said areas being adapted to be illuminated by means of lamps $L_1$ to $L_6$ (see FIGURE 3). These lamps are not visible in FIGURE 1. A start lamp $L_{St}$ and a start switch S are likewise provided on the front of the casing G. The illuminated areas 1 to 6 and the start lamp $L_{St}$ form the command transmitter. The top side $G_o$ of the casing G has six counters $Z_1$ to $Z_6$ which are assigned to the areas 1 to 6 in a manner to be described below. A microphone M (see FIGURE 2), which is not visible in FIGURE 1, is provided below a contact surface K in an extension of the base part of the device extending beyond the casing G towards the front, said microphone M acting on the counters $Z_1$ to $Z_6$ in a manner which will be described later on. The extension of the base U of the device is provided with a supporting means in form of a U-shaped clamp H having a slot in which test cards, divided into six areas $F_1$ to $F_6$, can be exchangeably inserted.

Figure 2:
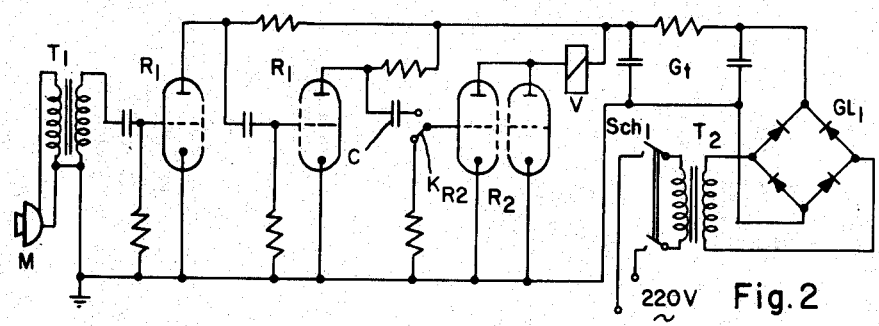
FIGURES 2 and 3 illustrate suitable embodiments of electric circuit diagrams for the device shown in FIGURE 1.

FIGURE 2 shows the circuit of a simple amplifier for amplifying the tapping noises received by the microphone M. The latter is connected to a grid of a tube $R_1$ by means of a transformer $T_1$ and conventional circuit components. A relay V is inserted in the anode circuit of a tube $R_2$, said relay being energized in rhythm with the pulses produced by the microphone M and, thereby, actuates a contact not shown in FIGURE 2. The tubes $R_1$ and $R_2$ are fed by voltages from a source in a manner known per se via a switch $Sch_1$, a transformer $T_2$, a rectifier unit $Gl_1$ and a smoothing filter $G_t$. The resistances and condensers not designated are conventional circuit components used in known arrangements.

Figure 3:
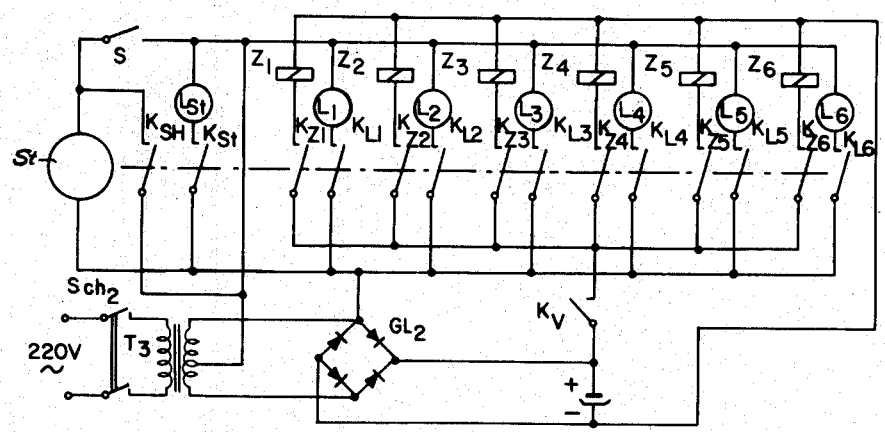

FIGURE 3 illustrates the control circuit for the command transmitter actuated by a control mechanism $St$ which, sequentially, operates the contacts $K_{SH}$, $K_{St}$, and $K_{Z1}$, $K_{L1}$ ... $K_{Z6}$, $K_{L6}$. The contact $K_{SH}$ is a self-holding contact for the control mechanism connecting the latter with a portion of the winding of the secondary of a transformer $T_3$. The lamps $L_1$ to $L_6$ connected in series with the contacts $K_{L1}$ to $K_{L6}$ are shunted across the control mechanism and connected to a tap on the secondary of the transformer $T_3$. The pulse counters $Z_1$ to $Z_6$, which are shunted across one another and connected in series with the contacts $K_{Z1}$ to $K_{Z6}$, are connected via a rectifier circuit $Gl_2$ connected to the secondary. The primary of the transformer $T_3$ is connected to the power lines by means of a switch $Sch_2$. A start switch S is provided in the circuit of the control mechanism.

Actually, a common start switch and a common transformer as the voltage sources will be provided according to the invention, i.e., for the amplifier circuit according to FIGURE 2 and the command circuit according to FIGURE 3. However, in order to explain the operation of the circuit more clearly, separate switches $Sch_1$ and $Sch_2$ and separate transformers $T_2$ and $T_3$ are illustrated in FIGURES 2 and 3.

During recording of all of the tapping noises picked up by the microphone M, the relay V of the amplifier circuit simultaneously has to control all of the counters $Z_1$ to $Z_6$ (FIGURE 3). Thus, it has to operate contact $K_V$ inserted in a common circuit of all of the counters $Z_1$ to $Z_6$.

The device according to the present invention operates as follows:

A test card is placed on the contact area K of the base U of the device. The subject is seated in front of the device and has a stylus in his hand. First, the network switches $Sch_1$ (FIGURE 2) and $Sch_2$ (FIGURE 3) are closed, whereby the amplifier is switched on and the control mechanism is ready to operate. By briefly depressing the starting switch S, the control mechanism is connected to the power line, said control mechanism, in turn, being operated by closing of its self-holding contact $K_{SH}$ (FIGURE 3). A few seconds after the control mechanism has started, the contact $K_{St}$ is actuated thereby, said contact connecting a red starting lamp $L_{St}$ to the powerline, whereupon the red lamp lights up and indicates to the subject that the test will begin in two seconds. After the two seconds, the contact $K_{St}$ is reopened and thereby the starting lamp $L_{St}$ is deenergized. Simultaneously, the contacts $K_{Z1}$ and $K_{L1}$ are closed, i.e., the lamp $L_1$ lights up and thereby indicates to the subject by illumination of area 1 on the front of the casing that the test is starting. The pulse counter $Z_1$ becomes operative with the lighting of the lamp $L_1$. The subject now starts to tap the test card on the area $F_1$ with the stylus at a speed as high as possible. The tapping noises on the base are received by the microphone M provided therebelow and are fed to the amplifier (FIGURE 2) as electrical pulses, which are received by the relay V as amplified pulses and energize the relay at the rate of the tapping noise. The relay V closes its contact $K_V$ (FIGURE 3) each time it is energized. By this contact $K_V$, the pulse counter $Z_1$ is operated at the tapping rate. The counter progresses one numeral with each pulse, so that on the counter $Z_1$, there appears the number of taps given by the subject on the area 1 of the test card. The contacts $K_{Z1}$ and $K_{L1}$ remain closed for 10 seconds, whereupon the control mechanism switches off these contacts $K_{Z1}$ and $K_{L1}$ and switches on the contacts $K_{K2}$ and $K_{L2}$. The lamp $L_1$ goes out and the counter $Z_1$ is switched off. Now, the lamp $L_2$ and the counter $Z_2$ are in operative condition. The subject changes the contact area during lighting up of the area 2, i.e., he taps the contact area $F_2$. His tapping performance is recorded in the counter $Z_2$ as only this counter is energized by the actuation of the contact $K_V$. The contacts $K_{Z2}$ and $K_{L2}$ remain likewise closed for ten seconds, whereupon the control mechanism switches on the next two contacts $K_{Z3}$ and $K_{L3}$ and, in the same manner, actuates the subsequent contacts. In other words, the subject sequentially taps the six areas $F_1$ to $F_6$ of the test card at intervals which are indicated by the illuminated areas 1 to 6, respectively. Consequently, the counters $Z_1$ to $Z_6$ are switched on one after the other and record the number of taps obtained on each of the contact areas $F_1$ to $F_6$. After completion of the test time, the control mechanism switches off the contacts $K_{Z6}$ and $K_{L6}$ and opens the self-holding contact $K_{SH}$, whereby the control mechanism is automatically stopped.

Upon completion of the test, the results immediately can be read and recorded on the test card. The apparatus or device is ready for a new test immediately after reset of the counter indication. This is particularly important, because it is possible to obtain a clear picture of the so-called "energy reserve" or "performance reserve" of the subject by repeating the test, said reserve with the conventional method not being fully analyzable in a single test by analysis of only the last two areas of the test card.

Figure 4:
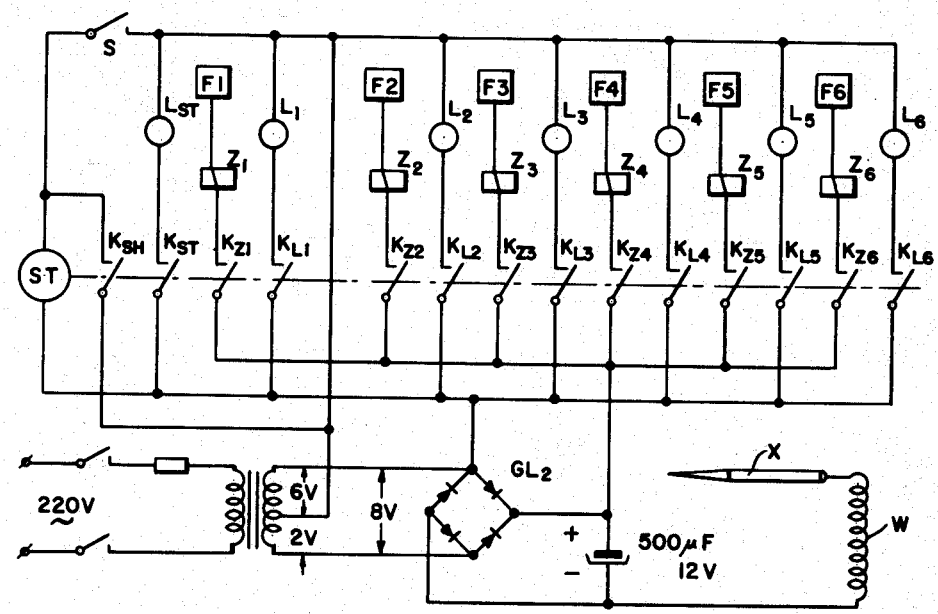
FIGURE 4 is a schematic diagram of a modified form of the invention, wherein electrically conductive plates are provided as the individual tapping surfaces, and a tapping stylus is electrically connected to a source of power such that contact of the stylus with one of the tapping plates actuates the circuit.

In the embodiment shown in FIGURE 4, circuit elements which are the same as those shown in FIGURE 3 are provided with similar reference characters. However, each of the surfaces $F_1$ to $F_6$ shown in FIGURE 1 individually comprises conductive contact plates bearing the same reference characters in FIGURE 4, these plates preferably being made of copper. In addition, a stylus X, preferably being made of silver, is provided, this stylus being connected by means of a flexible wire W to the condenser which appears across the rectifier $Gl_2$ and serves as a source of electrical potential. The other output terminal of the rectifier $Gl_2$ is connected by way of switches $K_{Z1}$ ... $K_{Z6}$ to the lower end of the counters $Z_1$ ... $Z_6$, respectively, so that when the stylus X is brought into contact with one of the contact plates $F_1$ ... $F_6$ the corresponding counter $Z_1$ ... $Z_6$ will be actuated, provided the associated switch $K_{Z1}$ ... $K_{Z6}$ is closed, meaning that the subject being tested is supposed to be tapping the particular contact plate $F_1$ ... $F_6$ corresponding to the closed switch.

Figure 5:
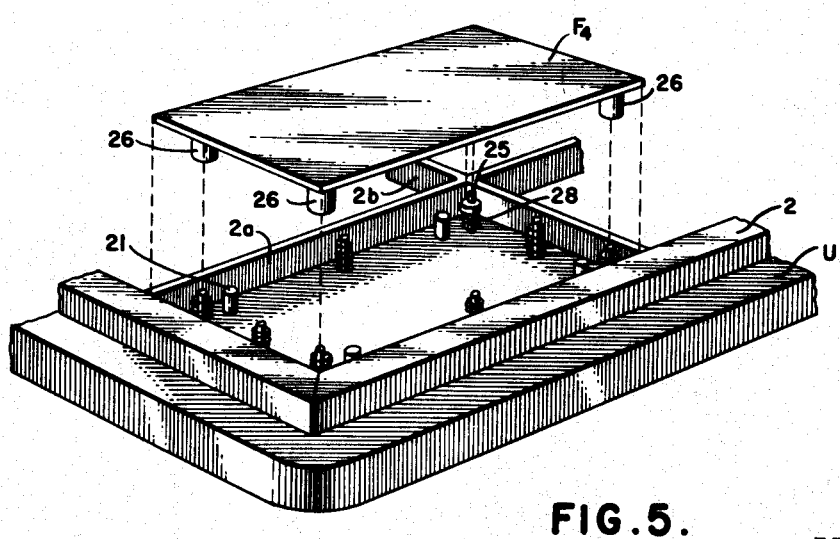
FIGURE 5 is a fragmentary, exploded perspective view illustrating still another modified form of the invention, wherein each tapping surface is associated with and comprises part of a separate electrical switch.

FIGURE 5 shows a mechanical structure, wherein the use of a stylus which is electrically connected to the circuit is unnecessary, and wherein the pressure of mechanically touching a contact plate closes a switch which is located therebelow. The base of the device shown in FIGURE 1 and designated with the reference character U has a frame 2 therearound, which frame is internally divided by crossed strips, such as 2a and 2b, which underlie the lines separating the various contact surfaces $F_1$ ... $F_6$. These contact surfaces, for instance the surface $F_4$, shown in FIGURE 5, are supported on upstanding pins, such as the pin 25, which carry coiled compression springs, such as the spring 28. Beneath the plate $F_4$, there is a plurality of contacts, such as the contact 21, against which the plate $F_4$ bears when the plate is depressed by compression of the springs 28. Each of the plates, such as plate $F_4$, has a plurality of guiding sleeves 26 which pass over the pins 25 and maintain the plate $F_4$ in the proper position, so that depression of the plate $F_4$ will cause contact with one or more of the contacts 21 located therebelow. It is understood that each of the plates, such as the plate $F_4$, will be electrically insulated from metallic parts connected with the frame 2 and the base U, and that an appropriate lead will be connected between each of the contact plates $F_1 \ldots F_6$ and an appropriate terminal of the power supply in the electrical counting circuit.

FIGURE 6 is a perspective view showing the details of the control mechanism $St$, it being understood, however, that the illustrated embodiment is but exemplary and that other suitable arrangements can be used to achieve the desired results. In the instant embodiment, the mechanism $St$ is mounted on a carrier plate 30 and comprises a motor 32 which is carried on one leg of a U-shaped bracket 31. The motor is connected to a control disk 34 by way of a transmission gear 33. The control disk 34 is rotatably mounted between the other leg of the bracket 31 and a bearing 39, and carries at its periphery a plurality of arcuate switch actuators 35 made of insulating material. The actuators on one side of the disk cooperate with the spring leaf contact switches $37_1$ to $37_6$ which correspond to contacts $K_{Z1}$ to $K_{Z6}$, respectively, of FIGURE 3, and which are mounted on the outer leg of the bracket 31, as shown in the drawing. The electrical connections of these switches $37_1$ to $37_6$ are not shown in FIGURE 6 since they are the same as those of the contacts $K_{Z1}$ to $K_{Z6}$, respectively, which is best shown in FIGURE 3. The switch actuators 35 on the other side of the disk 34 cooperate with similar switches (not shown), the latter correspoding to switches $K_{L1}$ to $K_{L6}$, respectively, of FIGURE 3. The disk 34 also carries a camming lug 36 which controls a switch 38, the latter being mounted on bracket 40 and corresponds to contact $K_{St}$ of FIGURE 3.

The arrangement of the parts is such that the switches $37_1$ to $37_6$ on the near side of the disk 34 and the non-illustrated switches on the far side of the disk 34 are closed only when the corresponding switch actuator 35 engages these switches, and that the switch 38 is closed only when it is engaged by the lug 36. The actuators 35 have no effect on the switch 38 and the lug 36 has no effect on the switches $37_1$ to $37_6$.

For the sake of clarity, the physical construction of a typical switch is shown in FIGURE 7, wherein one end of each spring blade 37 and 37' is mounted on an insulating block 41, the free ends of the blades 37, 37' carrying the actual contact elements 42, 43, respectively.

The switch $K_{SH}$ of FIGURE 3 is constituted by a further switch, not shown in FIGURE 6, which is arranged between the switch $37_6$ and the switch 38. This further switch is held open by a camming lug 44 carried by one of the insulated arcuate switch actuators 35; in the rest position the disk is so oriented that the further switch is held open by the lug 44. As soon as the device is actuated, the further switch is released by the lug 44, thereby closing the self-holding circuit. As the disk continues its rotation, the lug 36 will cause the switch 38 to assume its closed position for as long as the lug remains in engagement with this switch; similarly, the switch actuators 35 will hold the switches $37_1$ to $37_6$, as well as the switches on the other side of the disk 34, in closed position as long as the respective switch actuators 35 remain in engagement with the respective switches.

In this way, the various switches are closed and opened in the desired sequence.

Furthermore, the disk 34 carries a further cam surface (not shown) which causes the switch $K_{R2}$ of FIGURE 2 to move from the position shown in that figure to the position in which the capacitor C is connected to the grid of the tube $R_2$ whenever the apparatus is in operative condition, i.e., the switch will be held in the other position during the running off of a complete cycle. It is the movement of this switch which causes the counters to become activated only during the actual operation, thereby preventing these counters from responding to noises before or after the cycle.

Thus, the present invention provides a simple device which, advantageously, can be used for medical diagnostical purposes. With this device, a physician is in a position to obtain an exact picture in a short time of the performance capability of his patient by a simple test. The device saves cumbersome investigations and furnishes an extremely objective picture. Due to its simple construction and simple operation, it can be acquired and used by any physician, particularly, by a general practitioner.

I claim:

1. Apparatus for use in carrying out a tapping performance test and analyzing the results to ascertain human performance data, said apparatus comprising, in combination: a frame; a tapping surface on the frame divided into separate tapping areas; command means for indicating which area is to be tapped and the time and sequence of tapping; tapping pulse counter means associated with each area; microphone means at the tapping areas and picking up tapping sounds and delivering said pulses; and amplifier and relay means connected with the microphone means and connected to actuate said pulse counter means.

2. Apparatus for use in carrying out a tapping performance test and analyzing the results to ascertain human performance data, said apparatus comprising, in combination: a frame; a tapping surface on the frame divided into separate tapping areas; command means for indicating which area is to be tapped and the time and sequence of tapping; tapping pulse counter means associated with each area; and switch means at said tapping surface and closed by each tapping contact on said surface, said switch means comprising a metal plate on which said tapping areas are designated, and a conductive test stylus to be employed as the tapping instrument, said plate and stylus being connected with said counter means and controlling the latter to record the number of contacts therebetween.

References Cited in the file of this patent

UNITED STATES PATENTS

| | | |
|---|---|---|
| 1,937,445 | Smith | Nov. 28, 1933 |
| 2,527,469 | Vernon et al. | Oct. 24, 1950 |
| 2,738,595 | John et al. | Mar. 20, 1956 |
| 2,926,015 | Edrich | Feb. 23, 1960 |
| 2,958,956 | Olalainty | Nov. 8, 1960 |

FOREIGN PATENTS

| | | |
|---|---|---|
| 792,054 | Great Britain | Mar. 19, 1958 |
| 810,435 | Great Britain | Mar. 18, 1959 |